United States Patent [19]
Freeman et al.

[11] Patent Number: 5,895,134
[45] Date of Patent: Apr. 20, 1999

[54] ADVANCED PHOTO SYSTEM FORMAT SELECTOR

[75] Inventors: Jay D. Freeman; Thomas D. Carr, both of Leucadia; Frederick R. Chamberlain, IV, Vista, all of Calif.

[73] Assignee: Eastman Kodak Company, Rochester, N.Y.

[21] Appl. No.: 08/857,392

[22] Filed: May 16, 1997

[51] Int. Cl.⁶ .................................................. G03B 17/24
[52] U.S. Cl. ........................................ 396/319; 396/6
[58] Field of Search .................................. 396/310, 311, 396/319, 320, 6

[56] References Cited

U.S. PATENT DOCUMENTS

| | | | |
|---|---|---|---|
| 5,132,715 | 7/1992 | Taillie | 396/319 |
| 5,140,353 | 8/1992 | Stoneham | 396/319 |
| 5,170,198 | 12/1992 | Cannon | 396/310 |
| 5,227,824 | 7/1993 | Yoshida et al. | 396/310 |
| 5,471,265 | 11/1995 | Shibata et al. | 396/319 |
| 5,614,968 | 3/1997 | Miyasaka | 396/311 |

*Primary Examiner*—Safet Metjahic
*Assistant Examiner*—Michael Dalakis
*Attorney, Agent, or Firm*—William F. Noval

[57] ABSTRACT

A single use camera is preloaded with a roll of magnetically coated film with defined image frames. The camera has an exposure system for selectively exposing an image frame of the film in one of a plurality of image formats. The camera also includes a manually actuated mechanism coupled to a mounted permanent magnet. The magnet is movable to record a magnetic mark on the magnetically coated film at a predetermined location relative to an exposed image frame. The location of the mark is indicative of the image format of the exposed image frame.

2 Claims, 2 Drawing Sheets

ADVANCED PHOTO SYSTEM FORMAT SELECTOR

FIELD OF INVENTION

This invention relates in general to photographic systems and relates more particularly to a format selector for the advanced photo system which uses a magnetically coated film for information exchange.

BACKGROUND OF THE INVENTION

In conventional photographic systems, when a photographer wanted to photograph scenes using different frame formats, either a different film and lens or a different camera needed to be used for each different format. This was expensive, inconvenient, and annoying. The Advanced Photo System (APS) introduced last year is based on several new features which solve the multiformat problem. A new film is used which has a virtually transparent magnetic coating for information storage and exchange. New cameras which use the film permit three different formats to be used on the same role of film. The three print formats are C-classic—proportioned like conventional 35 mm film, H-group—proportioned like HDTV, and P - panoramic—a longer format for capturing landscapes and panoramic views. A format switch on the camera lets a user select and view each format. This format feature requires that the film be optically or magnetically recorded with this information by the camera. A need exists for a simple and low cost way to provide this feature in a single use camera loaded with APS film.

SUMMARY OF THE INVENTION

According to the present invention there is provided a solution to the needs of the prior art.

According to a feature of the present invention there is provided in a single use camera, having a roll of magnetically coated film with defined image frames disposed in said camera; and further having an exposure system for selectively exposing an image frame of said film in one of a plurality of image formats; the improvement comprising a movably mounted permanent magnet; and a manually selectable mechanism coupled to said permanent magnet for moving said permanent magnet to record a magnetic mark on said magnetically coated film at a predetermined location relative to an exposed image frame, said location of said mark being indicative of the image format of said exposed image frame.

According to a further feature of the present invention there is provided in a single use camera, having a roll of magnetically coated film with defined image frames disposed in said camera; and further having an exposure system for selectively exposing an image frame of said film in one of a plurality of image formats, and a plurality of prerecorded magnetic marks at different locations along an image frame, one each for each of said plurality of image formats; the improvement comprising a movably mounted permanent magnet; and a manually selectable mechanism coupled to said permanent magnet for moving said permanent magnet to erase all of said prerecorded magnetic marks except the said mark which is indicative of the image format of said exposed image frame.

ADVANTAGEOUS EFFECT OF THE INVENTION

The present invention has the following advantages.

1. Provides APS format selection for a single use camera.

2. Simple and low cost multiformat selector.

3. Permanent magnets have a long wear life and can be recycled many times.

DETAILED DESCRIPTION OF THE INVENTION

Figure 1:
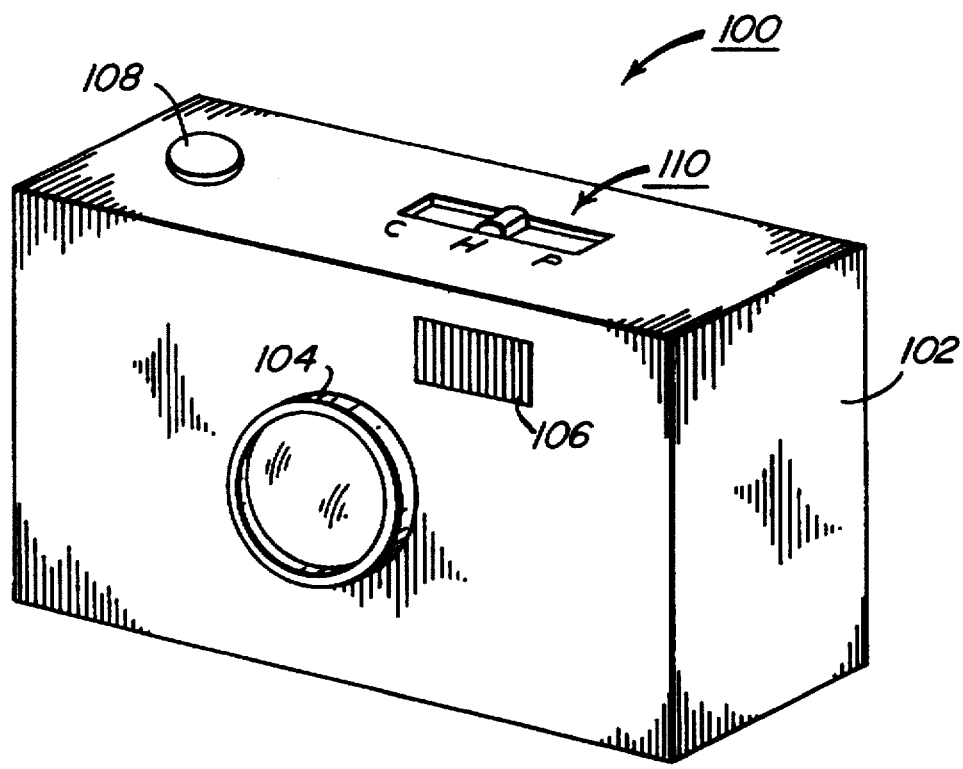
FIG. 1 is a perspective view of a single use camera incorporating the present invention.

Referring now to FIG. 1, there is shown a single use camera 100 incorporating the present invention. As shown, camera 100 includes a light tight housing 102 having a lens 104, a viewfinder 106, an exposure button 108, and a format selector mechanism 110. Single use camera 100 is of a type that is returned whole to a photo dealer for processing after the film has been exposed. Many of the camera parts can then be recycled with new film to be used in a new single use camera.

Figure 2:
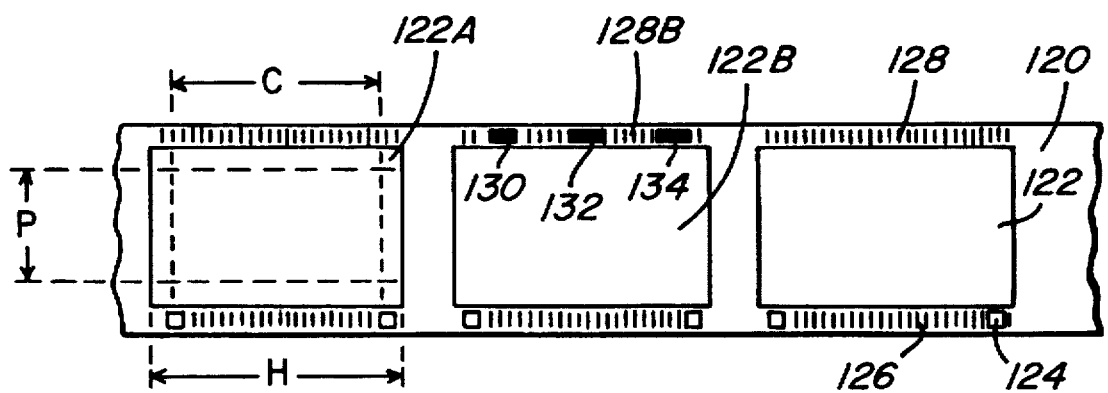
FIG. 2 is a diagrammatic view of a film strip illustrating the multiple APS formats and the location of magnetic markings indicative of the format of an exposed image frame.

Single use camera 100 is pre-loaded with a roll of magnetically coated film, such as APS film, magnetically coated 35 mm film, or the like during manufacture. FIG. 2 illustrates the APS film format. As shown, a strip of magnetically coated film 120 has a sequence of image frames 122 defined by apertures 124. Designated magnetic recording areas 126 and 128 are located along either edge of an image frame 122.

For each exposed image frame, the camera user can select a (C) Classic, (H) HDTV/Group, or (P) Panoramic print by means of format selector mechanism 110 (FIG. 1). The C, H and P formats are illustrated in the left-hand frame 122A of FIG. 2.

According to the present invention, there is provided a simple and inexpensive format for an APS single use camera. By manually selecting the desired format by means of selector mechanism 110, a magnetic mark indicative of the format is associated with the exposed image frame. The photofinisher uses the mark to print the image frame in the selected format. As shown in FIG. 2, magnetic recording area 128B of image frame 122B has illustrative magnetically recorded marks 130 indicative of the C format, 132 indicative of the H format, and 134 indicative of the P format. The spatial location of the mark is indicative of the format. It will be understood that only one of marks 130,132,134 will be present for each exposed frame.

According to the invention, the appropriate mark can be generated using one of two techniques. A single mark can be recorded by a properly located permanent magnet or unneeded prerecorded marks can be erased by a permanent magnet to leave only the appropriate mark. Following are described two embodiments of the present invention for effecting these techniques.

Figure 3:
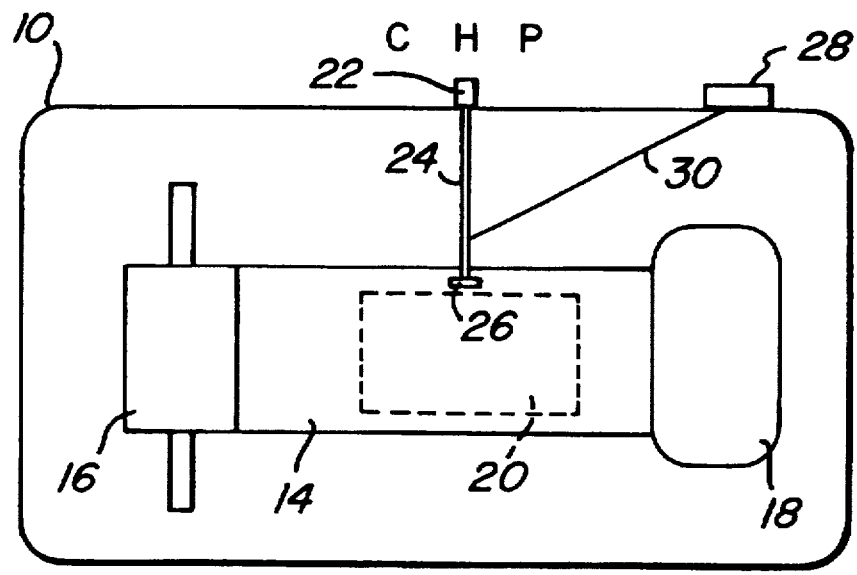
FIGS. 3 and 4 are diagrammatic views illustrative of embodiments of the present invention.

FIG. 3 shows a single use camera 10 with magnetically coated film 14, which is led from spool 16 to cassette 18. Dashed line 20 indicates the latent image area for a photograph. Selector switch 22 is connected by arm 24 to permanent magnet 26, and may be moved to one of the three positions C, H, or P as indicated. The magnet is normally not in contact with the film surface, and is positioned far enough away that it does not record to the film 14. When a picture is taken, by pressing shutter button 28, linkage 30 cause the magnet to touch the film surface, recording a magnetic mark. The relative position of the mark with respect to the frame determines the format (C, H, or P) for printing the photograph.

Figure 4:
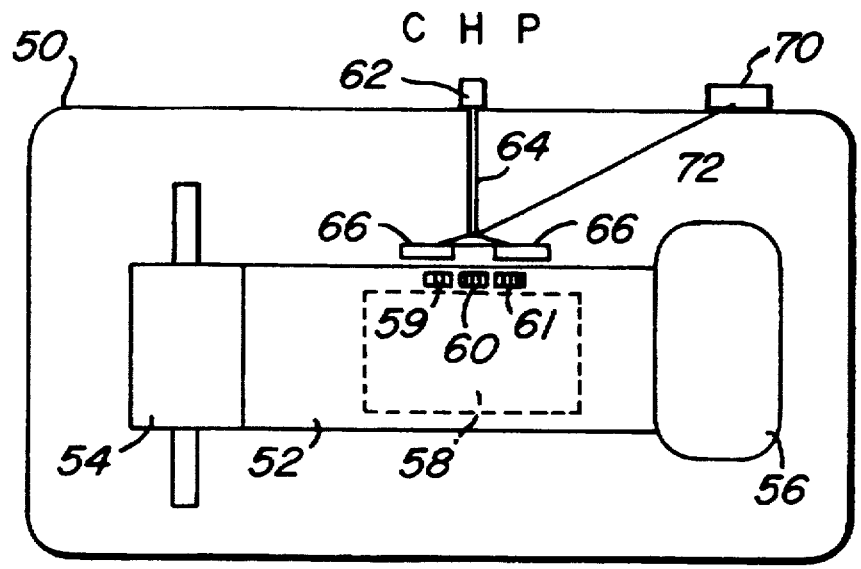

FIG. 4 shows an alternate method to provide format selection. Camera 50 has magnetically recordable film 52, led from spool 54 to cartridge 56. Above image area 58, the film has three magnetic data blocks, written prior to camera assembly. Block 59 is format C, block 60 is format H, and block 61 is format P. Selector switch 62 acts through arm 64 to position magnet pair 66, such that it is aligned to erase two of the three data blocks. When shutter button 70 is pressed, linkage 72 moves magnet pair 66 down, producing the selective erasure for that frame.

The invention has been described in detail with particular reference to preferred embodiments thereof, but it will be understood that variations and modifications can be effected within the spirit and scope of the invention.

| Parts List | |
|---|---|
| 10 | single use camera |
| 14 | magnetically coated film |
| 16 | spool |
| 18 | cassette |
| 20 | dashed line |
| 22 | selector switch |
| 24 | arm |
| 26 | permanent magnet |
| 28 | shutter button |
| 30 | linkage |
| 50 | camera |
| 52 | magnetically recordable film |
| 54 | spool |
| 56 | cartridge |
| 58 | image area |
| 59,60,61 | blocks |
| 62 | selector switch |
| 64 | arm |
| 66 | magnet pair |
| 70 | shutter button |
| 72 | linkage |
| 100 | single use |
| 102 | light tight housing |
| 104 | lens |
| 106 | viewfinder |
| 108 | exposure button |
| 110 | format selector mechanism |
| 120 | magnetically coated film |
| 122,122A,122B | image frames |
| 124 | apertures |
| 126,128,128B | magnetic recording areas |
| 130,132,134 | illustrative magnetically recorded marks |

What is claimed is:

1. A single use camera comprising:

a light tight housing;

a roll of magnetically coated film with defined image frames, preloaded in said housing;

a movably mounted permanent magnet normally out of contact with said film;

an exposure system for selectively exposing an image frame of said film in one of a plurality of image formats, said exposure system including a manually actuatable exposure member;

a manually actuatable format selection mechanism coupled to said permanent magnet for moving said permanent magnet to a position to record a magnetic mark on said magnetically coated film at a predetermined location relative to an exposed image frame, said location of said mark being indicative of the image format of said exposed image frame; and a linkage linking said exposure member with said permanent magnet, such that manual actuation of said exposure member causes said permanent magnet to contact said film to record a magnetic mark in said magnetically coated film.

2. A single use camera comprising:

a light tight housing;

a roll of magnetically coated film with defined image frames, preloaded in said housing;

a plurality of prerecorded magnetic marks at different locations along an image frame, one each for each of a plurality of image formats;

a movably mounted permanent magnet normally out of contact with said film;

an exposure system for selectively exposing an image frame of said film in one of a plurality of image formats, said exposure system including a manually actuatable exposure member;

a manually actuatable format selection mechanism coupled to said permanent magnet for moving said permanent magnet to a position to erase all of said prerecorded marks except the said mark which is indicative of the image format of said exposed frame; and a linkage linking said exposure member with said permanent magnetic such that manual actuation of said exposure member causes said permanent magnet to contact said film to selectively erase said prerecorded marks.

* * * * *